(12) United States Patent
Groenendaal et al.

(10) Patent No.: US 7,634,252 B2
(45) Date of Patent: Dec. 15, 2009

(54) MOBILITY MANAGEMENT IN WIRELESS NETWORKS

(75) Inventors: Johan van de Groenendaal, Marlborough, MA (US); Amitava Chakraborty, Acton, MA (US)

(73) Assignee: Computer Assocaites Think, Inc., Islandia, NY (US)

( * ) Notice: Subject to any disclaimer, the term of this patent is extended or adjusted under 35 U.S.C. 154(b) by 208 days.

(21) Appl. No.: 10/786,982

(22) Filed: Feb. 24, 2004

(65) Prior Publication Data

US 2004/0185876 A1    Sep. 23, 2004

Related U.S. Application Data

(60) Provisional application No. 60/452,663, filed on Mar. 7, 2003.

(51) Int. Cl.
*H04M 1/66* (2006.01)
*H04M 1/68* (2006.01)
*H04M 3/16* (2006.01)
*H04K 1/00* (2006.01)

(52) U.S. Cl. .................. 455/410; 455/411; 380/247; 380/250

(58) Field of Classification Search ............ 455/410, 455/411, 435, 435.1, 450, 452.1; 380/247, 380/248, 249, 250
See application file for complete search history.

(56) References Cited

U.S. PATENT DOCUMENTS

| | | | |
|---|---|---|---|
| 5,247,698 A | 9/1993 | Sawyer et al. | |
| 5,345,595 A | 9/1994 | Jensen et al. | |
| 5,907,602 A | 5/1999 | Peel et al. | |
| 6,259,907 B1 | 7/2001 | Bellamy, Jr. et al. | |
| 6,370,373 B1 * | 4/2002 | Gerth et al. | 455/410 |
| 6,466,777 B1 * | 10/2002 | Urita | 455/410 |
| 6,690,939 B1 * | 2/2004 | Jonsson et al. | 455/453 |
| 6,754,488 B1 * | 6/2004 | Won et al. | 455/424 |
| 6,904,278 B2 * | 6/2005 | Iyer | 455/424 |
| 7,142,868 B1 * | 11/2006 | Broyles et al. | 455/453 |
| 7,289,813 B2 * | 10/2007 | Karaoguz | 455/456.1 |
| 7,295,524 B1 * | 11/2007 | Gray et al. | 370/254 |

(Continued)

FOREIGN PATENT DOCUMENTS

EP    0544449    6/1993

(Continued)

OTHER PUBLICATIONS

Oct. 8, 2004 Communication Relating To The Results Of The Partial International Search in connection with International Application No. PCT/US2004/005840 which corresponds to the above-identified application.

*Primary Examiner*—George Eng
*Assistant Examiner*—Un C Cho
(74) *Attorney, Agent, or Firm*—Baker Botts L.L.P.

(57) ABSTRACT

Systems and methods for tracking and managing mobile devices in a wireless network are provided. For example, the method can include discovering wireless devices connected to the wireless network, collecting association information from access points, with the association information from an access point including information identifying a current association between the access point and an associated wireless device, and providing a visualization of current associations between the access points and corresponding associated wireless devices. A conflict resolution engine may be provided for resolving conflicting access point associations.

19 Claims, 2 Drawing Sheets

U.S. PATENT DOCUMENTS

| | | | |
|---|---|---|---|
| 7,382,756 B2 * | 6/2008 | Barber et al. | 370/338 |
| 2001/0034232 A1 | 10/2001 | Kuwahara | |
| 2002/0133721 A1 | 9/2002 | Adjaoute | |
| 2003/0018771 A1 | 1/2003 | Vinberg | |
| 2003/0117985 A1 * | 6/2003 | Fujii et al. | 370/338 |
| 2003/0185244 A1 * | 10/2003 | Wu et al. | 370/503 |
| 2003/0207683 A1 * | 11/2003 | Lempio et al. | 455/422.1 |
| 2005/0059396 A1 * | 3/2005 | Chuah et al. | 455/435.1 |

FOREIGN PATENT DOCUMENTS

| | | |
|---|---|---|
| EP | 0714219 | 5/1996 |
| EP | 0714219 A2 | 5/1996 |
| EP | 1119210 | 7/2001 |
| WO | 0178421 | 10/2001 |
| WO | WO 01/78421 A2 | 10/2001 |

* cited by examiner

MOBILITY MANAGEMENT IN WIRELESS NETWORKS

CROSS-REFERENCE TO RELATED APPLICATIONS

This application claims the benefit of commonly assigned U.S. Provisional Application No. 60/452,663, filed Mar. 7, 2003 and entitled "MOBILITY MANAGEMENT IN WIRELESS NETWORK".

TECHNICAL FIELD

This application relates to wireless networks. In particular, the application relates to wireless network management and mobility management in wireless networks.

DESCRIPTION OF RELATED ART

Mobile devices for personal use are currently very popular. The popularity of mobile devices is carrying over to the enterprise. It has often been predicted that all end-user connectivity will soon be wireless, and enterprises will operate in a hybrid wired-plus-wireless environment.

In a wired-plus-wireless enterprise environment, employees are free to perform their jobs from their workplace of choice, regardless of whether the workplace is in an office or on the move. Increased mobility and flexibility are facilitated by leveraging wireless technologies.

The current line between computing and telephony on handheld devices is rapidly blurring. Devices that combine the features of mobile phones and PDAs (Personal Digital Assistants) are already popular. With data storage capabilities and network bandwidth steadily improving, it will not be long before the capabilities of today's high-end desktop computer are available in a device that fits into a pocket. Eventually, there will be one combined device, carried in a pocket or worn, on which one can perform scheduling, e-mail, web surfing, videoconferencing, document management and even take business and personal calls.

Some enterprises have integrated their telephone systems with wireless local area networks. Using technologies such as Voice-over-IP (VoIP), enterprises aim to reduce the costs associated with elaborate telephone cabling by leveraging the benefits of wireless networks.

An inescapable trend is migration towards wireless networks for all end-user oriented computing. There are many situations in which wireless networks are needed in the regular course of business of an enterprise.

For example, a network administrator is troubleshooting a problem at a remote site when a critical system at a separate location goes down. A simple (but immediate) configuration change is needed, and the administrator cannot afford to wait until he returns to his desk.

As another example, a salesperson needs to connect to vital information on the company's intranet from his PDA while waiting for a flight at an airport terminal.

In another example, an employee of an enterprise may be visiting a branch office to attend a series of meetings. The employee may need to remain connected through e-mail without having to log in and log out with every room change.

Wireless networks can benefit the operation of an enterprise in a number of ways. The ability of employees to be mobile, yet connected to enterprise resources, gives them the opportunity to work more efficiently. Wireless environments provide the employee flexibility to work in whatever surroundings are convenient to accomplish the task at hand.

Timely delivery of information without the need to be connected through a wired network which may be desirable in many instances to support business decision-making is enabled through a wireless infrastructure. Since there are no physical cables to maintain, it is easy to conduct configuration and repair operations on devices and other network components, and therefore the productivity of the network administration staff of the enterprise may be improved.

There are a few different types of wireless networks. Wireless network specifications vary in the number of devices in the wireless network, range of transmission, average size of data transfers, network speed, security measures and other parameters.

Wireless Personal Area Networks (WPAN) serve a radius of 10 to 50 feet. The Bluetooth specification is the prevailing standard in the WPAN arena. WPANs facilitate wireless communication between devices, such as between PDAs and printers, between wireless keyboards and personal computers, and between other components that comprise a small network. Homes and small offices are the primary adopters of WPAN technology.

Wireless Local Area Networks (WLAN) provide wireless access over a range of up to several hundred feet. A typical WLAN has several mobile devices, such as PDAs, mobile phones and laptop computers, that access enterprise information through hardware called "access points".

Access points are network devices that bridge two network segments, such as a wireless network to a wired Local Area Network or other wired infrastructure. Access points, such as wireless bridge devices and wireless DSL router devices, can be connected to enterprise resources through a firewall for added security. Wireless bridge devices bridge wired and wireless networks, and are the most common form of access points deployed in an enterprise network. Wireless DSL router devices allow users to connect to DSL service. The interface between the DSL gateway and the DSL router is generally Ethernet, which allows a service to be provided to multiple users on the network without exposing how many users are connected to the network.

A mobile device is typically authenticated and associated with an access point before communication between the mobile device and the access point can begin. The mobile device commences the association process by, for example, scanning for beacon frames transmitted by the access point, proactively sending probe frames and analyzing their responses, etc. The frames and responses transmit a mobile device's desired features and an access point's capabilities, so that both parties can decide if they are synchronized with each other and can proceed to setup communication.

A mobile device may use a number of parameters, such as proximity to an access point, signal strength, etc., to select an access point from amongst other candidate access points for association.

The number of mobile devices which can be concurrently supported by an access point may vary from one access point to another. Knowledge of the number of access points which are needed to support wireless users in an enterprise and the geographic locations at which the access points can be placed to maximize coverage are integral to effective management of the wireless network in the enterprise.

The IEEE 802.11b, 802.11a and 802.11g specifications each are widely adopted by enterprises to implement WLANs today. Each of these specifications addresses issues specific to its design.

The IEEE 802.11b specification is used as an extension of Ethernet and is quite flexible for enabling different kinds of traffic to pass over a WLAN. For example, disparate systems, such as Intel-based personal computers and Macintosh computers, can communicate over 802.11b networks. Adapters complying with the 802.11b standard are also available for PDAs (such as Palm OS and PocketPC based devices).

The 802.11b standard facilitates wireless transmission of up to a maximum of 11 Mbps of data, at distances ranging from a few feet to several hundred feet, over the standard 2.4. GHz unlicensed band. However, the coverage distance depends on a line of sight, and occurrences of unforeseen obstacles in the transmission path may hamper transmission and result in lower data rates.

The 802.11b wireless network platform is currently popular for public short-range networks or wireless public access networks, also known as "hotspots," such as those found at airports, hotels, conference centers, coffee shops and restaurants.

Under the 802.11a specification, wireless transmission may proceed at up to 54 Mbps over the 5 GHz band. Transmission under the 802.11a specification is ideal for large data file transfers and bandwidth intensive applications over a limited area. However, while performance and throughput are significantly increased, the transmission range is notably reduced as compared to 802.11b.

Under the 802.11g specification, wireless transmission may proceed at up to 54 Mbps over 2.4 GHz. The 802.11g specification is considered the next-generation wireless network platform for the enterprise.

Wireless Wide Area Networks (WWAN) extend coverage of wireless access over large geographic areas, through wireless carriers (also known as wireless operators). The main communication standards currently used are based on CDMAOne or GSM. While most of the wireless operators are now aiming to implement the next-generation technology (also referred to as "3G"), a majority of the current infrastructure is at an intermediate 2.5G level. Enterprises with highly mobile workforces are adopting this technology.

A wireless network often exists in a "heterogeneous environment", which, as used herein, refers to a network environment in which the plural devices and other information sources on the network have plural access protocols, which may be vendor-specific and/or require a proprietary format. Therefore, enterprises in many instances adopt more than one of the above-mentioned wireless technologies to obtain a wireless network that can be leveraged by the entire enterprise.

Although wireless technology is opening the door to a completely new dimension of computing and business practices that propel enterprises to new heights of service and flexibility, wireless networks come with their share of unique issues, particularly in the areas of infrastructure management and security. The components that make up a wireless infrastructure, such as servers, companion desktops, access points, etc., require effective monitoring and management, in order to maintain an optimal work environment and increase productivity. In addition, since a variety of mobile devices may proliferate throughout the enterprise, it is desirable to secure, manage, monitor and optimize use of the devices. Therefore, mobile devices like PDAs, cell phones and laptops (and the assets stored on them) need to be secured and managed in wireless network environments.

SUMMARY

This application provides a system for tracking and managing mobile devices in a wireless network. In one embodiment, the system includes a plurality of device agents and a device manager. Each device agent is assigned to collect association information from a corresponding set of access points in the wireless network. The association information from an access point includes (a) information identifying a current association between the access point and an associated wireless device and/or (b) information identifying mobile units and other wireless devices which are associated with the access point. The device manager receives the collected association information from the device agents, and has a conflict resolution engine for resolving conflicting access point associations.

The system, according to another embodiment, includes in addition a topology service. The topology service provides a visualization of access points and corresponding associated wireless devices.

The application also provides a method for tracking and managing mobile devices in a wireless network. In one embodiment, the method includes discovering wireless devices connected to the wireless network, collecting association information from access points, and providing a visualization of current associations between the access points and corresponding associated wireless devices.

A method for tracking and managing mobile devices in a wireless network, according to another embodiment, includes collecting association information from a plurality of access points in the wireless network, and resolving conflicting access point associations through a conflict resolution engine.

BRIEF DESCRIPTION OF THE DRAWINGS

The features of the present application can be more readily understood from the following detailed description with reference to the accompanying drawings wherein.

DETAILED DESCRIPTION

This application provides mobility management tools (in the form of systems and methodologies) for monitoring and managing a wireless network and/or for tracking and managing mobile devices in the wireless network. The tools may be embodied in a computer program stored on a computer readable medium and/or transmitted in one or more segments via a computer network or other transmission medium.

A system 10 for tracking and managing mobile devices in a wireless network, according to one embodiment (FIG. 1), includes device agents 11-1 through 11-N, device manager 12 and a topology service 13. Each device agent (11-1 through 11-N) is assigned to collect association information from a corresponding set of access points 18-1 through 18-M in a wireless network 19. The device manager 12 receives the collected association information from the device agents (11-1 through 11-N), and may assign the access points to the device agents by balancing a workload across the device agents. The association information from an access point 18-1 includes information identifying a current association between the access point 18-1 and an associated wireless device 17-1. The topology service 13 provides a visualization of associations between one of the access points 18-1 through 18-M and corresponding associated wireless devices (17-1 through 17-L). The association information for the access point 18-1 may be retrieved from an association table maintained by the access point 18-1.

The device manager can consolidate the collected information, resolve any conflicts in the collected information, and optionally log the resolved information. The device manager may also track a mobile wireless device connected to the wireless network by using the collected association information. Other optional features of the device manager include detecting unauthorized rogue devices connected to the wireless network, detecting unauthorized access points, detecting disassociated mobile units, etc.

A device agent may regularly poll its assigned set of access points to determine changes to associations of the access points. A device agent may query the access points to request association information from the access points.

Figure 1:
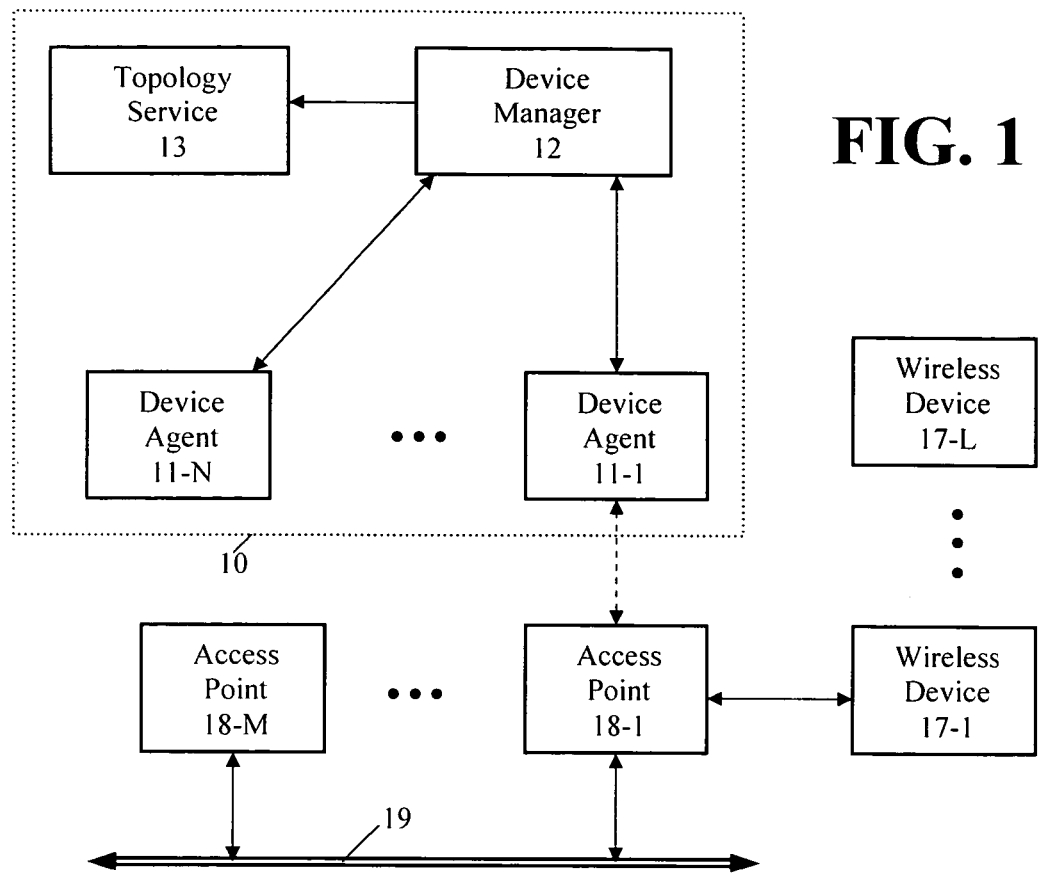
FIG. 1 shows a block diagram of a system, according to one embodiment, for tracking and managing mobile devices in a wireless network.
Figure 2:
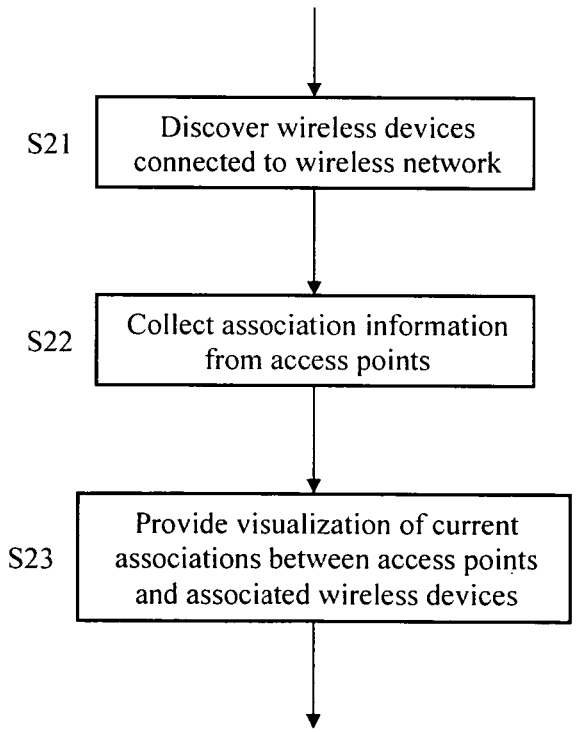
FIG. 2 shows a flow chart of a method for tracking and managing mobile devices in a wireless network, in accordance with the embodiment corresponding to FIG. 1.

A method for tracking and managing mobile devices in a wireless network, according to one embodiment, will be described with reference to FIGS. 1 and 2. A discovery process is performed to discover wireless devices 17-1 through 17-L connected to the wireless network 19 (step S21). Association information is collected from access points 18-1 through 18-M (step S22). A visualization of associations between one of the access points 18-1 through 18-M and corresponding associated wireless devices (17-1 through 17-L) is provided (step S23).

The method may further include tracking a mobile wireless device connected to the wireless network by using the collected association information. According to one embodiment, the method further includes generating mobility information by consolidating the collected association information and resolving any conflicts in the collected information, and logging the resolved mobility information.

The method may further include one or more of the following: detecting unauthorized rogue devices connected to the wireless network; detecting unauthorized access points; and/or detecting disassociated mobile units.

A system for tracking and managing mobile devices in a wireless network, according to another embodiment (FIG. 3), will be explained. The system 30 includes device agents 31-1 through 31-N and a device manager 32. Each device agent (31-1 through 31-N) is assigned to collect association information from a corresponding set of access points (39-1 through 39-M) connected to the wireless network 38. The association information from an access point 39-1 includes information identifying mobile units 37-1 through 37-L which are associated with the access point 39-1.

The device manager 32 receives the collected association information from the device agents (31-1 through 31-N), and has a conflict resolution engine 32a for resolving conflicting access point associations. The association information may include identification of disassociated mobile units and/or other information describing disassociation of a mobile unit from an access point.

The association information from the access point may also include address information of the mobile units (37-1 through 37-L) which are associated with the access point 39-1, and the conflict resolution engine 32a uses the address information to resolve conflicting access point associations with a mobile unit. In addition, the association information from the access point can optionally include time stamps associated with the association information, and the conflict resolution engine 32a uses the time stamps to resolve conflicting access point associations to a mobile unit.

The conflict resolution engine 32a can resolve a conflict between the associations of a mobile unit to two or more access points, and may request appropriate ones of the device agents to query access points corresponding to the conflicting associations. The conflict resolution engine may use network traffic statistics for a mobile device to resolve whether the device is associated with an access point. The conflict resolution engine 32a may be rule-based.

The device agents may obtain the association information by querying the access points. The device manager may send a request to a device agent to trigger the query process of the device agent.

The system may further comprise a topology service adapted to provide a visualization of current associations between the access points and the mobile units, through a graphical user interface. The visualization may be associated with a subnet.

Figure 3:
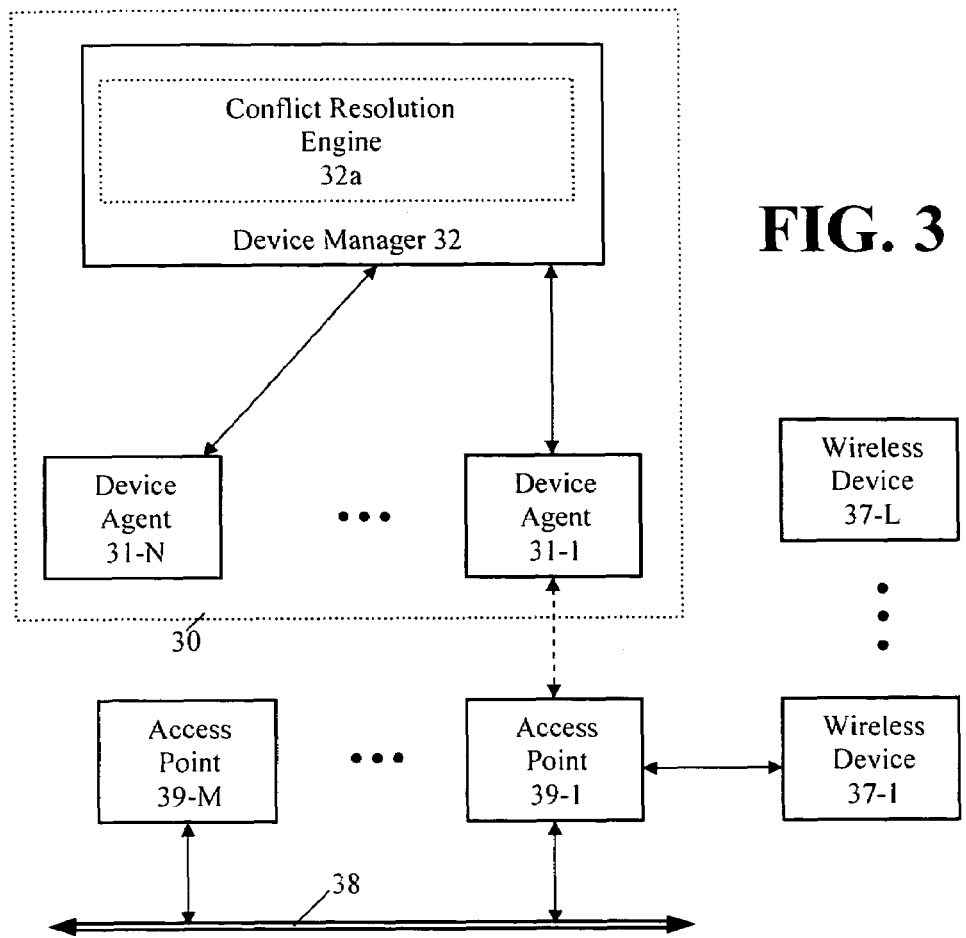
FIG. 3 shows a block diagram of a system for tracking and managing mobile devices in a wireless network, according to another embodiment.
Figure 4:
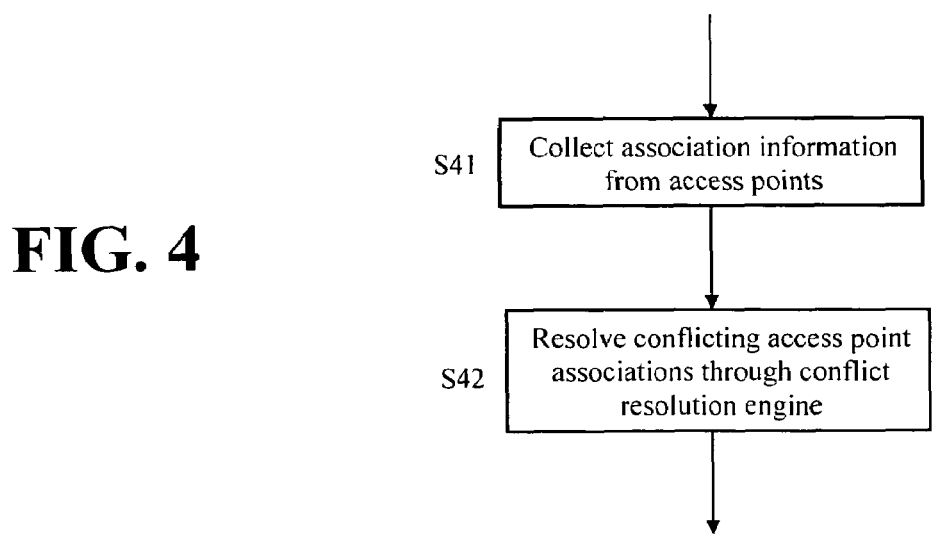
FIG. 4 shows a flow chart of a method for tracking and managing mobile devices in a wireless network, in accordance with the embodiment corresponding to FIG. 3.

A method for tracking and managing mobile devices in a wireless network, according to another embodiment, will be described with reference to FIGS. 3 and 4. Association information is collected from the access points (39-1 through 39-M) in the wireless network 38 (step S41). The conflict resolution engine 32a resolves any conflicting access point associations (step S42). The method may further include using network traffic statistics for a mobile device to resolve whether the device is associated with an access point.

The mobility management tools of this application may be adapted for a heterogeneous environment, in order to handle the plural devices and other information sources on the network which have plural access protocols.

Additional exemplary embodiments of mobility management tools are described below.

Discovery

The wireless network management process includes discovering wireless devices connected to the wireless network. An administrator of the network can obtain, through device discovery, knowledge of mobile devices which are being used on the network. Tracking and maintaining an inventory list of authorized devices can be used to eliminate unauthorized access to the wireless network.

Although discovering devices on a wired network may be a relatively straightforward process, discovery can be challenging with a wireless network. Some devices may roam out-of-range or dynamically connect to a different access point on the network, which changes the network configuration. Therefore, close monitoring of wireless networks is desirable to ensure efficient operation.

In addition, it is generally desirable that all points of access to the wireless network are known, controlled and accounted for. Since access point devices are relatively inexpensive, individual employees or departments may easily purchase an access point device and setup an unauthorized wireless network. Unauthorized access points may present security breaches in the network because they are vulnerable in their default configurations. It is generally desirable to detect unauthorized access points and remedy the situation as soon as possible.

Discovery is a process through which wireless network devices can be rendered visible and manageable. The process includes locating wireless devices and access points connected to the wireless network. The discovery process may also include detecting and identifying workstations, routers, systems, databases, application, network devices, and the relationships among them.

Once discovery commences, the discovery engine may proceed to identify all of the elements of the information technology infrastructure and wireless network that one may want to manage, in order to ensure that all of the components in the wireless network, such as servers, desktop computers, access points, etc., are accounted for and their physical and logical connections are mapped. After the components are detected and connections are mapped, administrators can detect unauthorized components and take the appropriate actions, with more ease.

A device manager and device agents deployed on the wireless network handle the discovery process. The device manager initiates device agent discovery to query all of the devices connected to the wireless network for device agents. When a device agent is detected, the device manager allocates subnets for the agent to manage. As additional device agents are discovered, the device manager spreads the work load across the device agents.

Optionally, the discovery may take place on both wired and wireless networks. For example, the agent and manager may both reside on the wired side and manage the wireless network. As another example, discovery may not differentiate the process as between wired network and wireless network.

For example, the device manager may balance the workload across device agents. On startup, the device manager identifies the device agents already discovered and assigns subnets to each agent, based on the device agent's configuration. If a device agent is not associated with any particular subnet, the device manager may randomly assign one or more subnets to the device agent, in order to achieve a uniform distribution amongst device agents. The device manager monitors for new device agents and for changes to agent configuration and takes the appropriate action to ensure maximum efficiency of the wireless network.

Each device agent is responsible for managing its assigned subnetworks and uses a number of discovery and classification mechanisms to build a view of the devices on the network.

For example, device agents look for rogue devices connected to the wireless network. Rogue devices are wireless devices that have been discovered but have not yet been identified as devices with authorization to access the network. New wireless devices are classified as rogue until authorization is granted.

In order to help identify devices that are rogue, all of the devices connected to a wireless network are identified and classified. A device agent may use a number of conventional network management techniques, including ping and SNMP (Simple Network Management Protocol) sweeps, HTTP (Hypertext Transfer Protocol), Telnet, MAC (Media Access Control) address namespacing, etc., to identify and classify devices. A set of rules may be used to classify devices that are rogue access points.

Mobile Device Management

Unlike wireline networks, wireless devices such as handhelds may move and therefore their locations constantly change. Knowledge regarding wireless devices connected to a network is desirable from a network management perspective, especially when there is a need to track the user down because of a security breach.

The mobile nature of devices such as PDAs, cell phones, laptops, etc., compels the need to effectively manage and secure the mobile components. Mobile components of a wireless enterprise, including laptops, PDAs and other wireless devices, may be managed and secured through effective control without restricting the user's freedom to leverage the benefits of being mobile.

Managing a wireless network includes tracking the current location and other details of mobile devices connected to the wireless network. Mobile devices by nature have the freedom to "roam." For example, a university professor may take his wireless laptop with him to class and then tote it to the library an hour later at the other end of campus. As he moves across campus, his laptop may be associated and disassociated with multiple access points along the way.

A mobile device in the wireless network may be, tracked based on association with an access point. Knowledge of where the access point is translates to knowledge of a proximity of the wireless unit. In addition, signal strength, signal-to-noise ratio and other measurements enable rough distance calculations.

Mobile devices constantly associate and disassociate with access points. As a mobile device travels, it may leave an associated access point's range and therefore becomes disassociated from the access point. The device may then be associated with another access point as it comes into range of the other access point. This behavior is expected since an access point's radio coverage decreases as the distance between the access point and mobile device increases. Other conditions, such as the following, may cause disassociation of a mobile device from an associated access point: disassociated due to inactivity; disassociated because the access point is unable to handle all currently associated devices; disassociated because authentication of the mobile device is no longer valid; etc.

If an access point does not have any associations or has an unusually low number of associations, it may raise a red flag that the access point has some performance issue.

The term "mobility management" refers to the task of tracking and managing the network traffic of mobile devices, such as the professor's laptop, as associations and disassociations occur. Mobility management allows an organization to locate mobile devices in the network in approximately real time.

Mobility information may be obtained by using information from access points. Typically, access points maintain information about their associations with mobile units. The association information can be retrieved from the access points and association data can be presented graphically through a visual display. Any of a variety of protocols, such as SNMP, Telnet, HTTP, etc., may be used to fetch association information from access points.

The collected information may be used to determine whether a mobile unit is still connected to the network, how it is connected to the network, and track the mobile unit as it roams across the wireless network. For example, a mobility engine may detect when a disassociated device reconnects to the network, and notify a topology service (described below) that the device is reassociated in the network (as well as the details of the association). The topology service can then update topology maps to display the new details.

When properly configured, a mobile unit can be associated with one and only one access point at any point of time. The information collected from the access points should be consistent with this property. When a mobile unit moves away from the domain of an access point, it disassociates from the access point and may associate with another access point.

Information regarding association of a mobile unit with an access point is reliable when the mobile unit becomes associated with the access point. However, the information becomes unreliable when the same mobile unit disassociates from the access point. If the mobile unit becomes associated with another access point, a potential conflict exists if both access points depict an association with the same mobile unit. In practice access points often fail to update their disassociation information. In such a situation, a mobile unit can be found to be associated with multiple access points. Because this situation occurs frequently in practice, conflict resolution is provided through mobility management.

As discussed above, the wireless network management architecture may be based on a divide-and-conquer strategy implemented through a device manager and multiple device agents. The device manager delegates work items to the device agents. The device agents collect information and send the collected information to the device manager. The device manager assembles the results and presents a unified result, which may be used to generate topology maps.

The device manager divides the entire group of discovered access points into sets, and delegates the responsibility for managing the access point sets to corresponding device agents. Each device agent is solely responsible for the set of access points to which it is assigned. The device manager preferably uses a load balancing approach to assign access points to the device agents.

The device manager sends a request to the device agents to start polling access points for association information. Each device agent sends a query to the access points that come under its purview. Access point respond to the query from the device agent by sending information from their association tales.

The collected association information is dispatched from the device agent to the device manager. The device manager has a central conflict resolution engine which consolidates, processes the information and resolves any outstanding conflicts in the association information. Next, the consolidated information is forwarded for display on the topology map.

A device agent may periodically or regularly poll all access points under its scope. If any new associations are discovered or any existing associations change, the change is forwarded up to visualization for display on the maps.

If it is determined that a mobile unit is not associated with any access points, the mobile unit is inserted in the disassociated folder. A mobile units in the disassociated folder can subsequently be moved back to an associate map if an association is found.

The association anomaly is not just restricted to associations between one mobile unit and multiple access points. The same anomaly that fails in depicting a disassociation can falsely depict a single association. For example, although querying the access points may show association of a mobile unit MU#1 with an access point AP#1, the result is not definitive. MU#1 may already have disassociated with AP#1, with AP#1 still depicting the old information.

A rule-based conflict resolution approach may be used to unravel conflicting information and determine the access point which is associated with a mobile unit. A probability may be determined (and assigned to the mobility information), based on the number of access points which report that a mobile unit is associated with the access point.

Resolved mobility information may be logged. A logged entry may include the following information: the date the entry was logged; the time the entry was logged; the MAC (Media Access Control) Address of the mobile unit; the IP Address of the mobile unit; the association state (for example, Unknown; Authenticated; Deauthenticated; Associated; Disassociated, etc.); a probability that the mobility information is correct; and IP Address of the access point.

The logged mobility information is useful for determining the following: density ratios of users per access points as a function of time; how a mobile user moves from access point to access point as a function of time and geography (based on location of access point); and total number of mobile units associated as function of time.

The knowledge obtained through tracking a mobile unit may also facilitate software updates to the mobile unit. For example, pushing software to a mobile unit may be effected through servers distributed across an organization, and preferably through the nearest server. If the mobile unit moves, then continued delivery can be shifted to a more appropriate distribution server. Mobility management can provide accurate information to a server regarding the mobile unit's location, in order to facilitate intelligent software distribution, or e-mail delivery, to the mobile unit.

Topology

Tracking the devices on a wireless network may include maintaining a current and accurate topology of the network. A topology service may be provided for constructing a topology of the wireless network, based on information gathered by the device manager and through mobility management. The topology service also may provide a visualization of the mobility information regarding the wireless network.

A real-time map may be provided to show the current associations between access points and wireless devices, with mobile units being the primary category of wireless devices. Other configured devices on the wireless network which are discovered may be included in the topology map. In this manner, a network administrator can identify, for example, the owner of the mobile device and a connected companion personal computer (PC). Once a device is associated with a companion PC, measures can be taken to authenticate the owner during wireless access.

Once the components in the wireless infrastructure are discovered, the resulting map can be used to construct a more effective topology for improving the performance of the wireless network. Wireless networks generally have a hierarchical topology and each mobile device is associated with an access point it uses to connect to the network.

As mobile units roam between access points, the topology changes to reflect this movement. Mobile devices on the wireless network can be tracked and their locations mapped accordingly.

The mappings can reveal mobile unit traffic patterns. Analyzing topological information can help in identifying certain locations or regions where the concentration of mobile devices is heavy or light. This analysis coupled with observations during selected time periods can enable effective spatial and temporal allocation of network resources and services.

After discovering the access points and wireless devices connected to the network, a highly visual and naturally intuitive approach to wireless network management may be presented with a number of visualization utilities.

As devices are discovered on the network, data objects corresponding to representations of the discovered devices may be created and associated with the discovered devices and populate an object repository. Once their descriptions and relationships are stored in the repository, objects can then be used for display on the two-dimensional (2D) and three-dimensional (3D) maps.

For example, maps, browsing tools, and other visualization utilities and functionality may be provided for viewing and navigating the wireless network. An Explorer interface may be provided for managing the enterprise-wide wireless network. According to one embodiment, Explorer functionality may be implemented in Java, in order to integrate and host wireless GUI components and devices.

A number of 2D and 3D maps may be provided. For example, a Wireless LAN Topology view may be provided to display wireless domains located in the network. A Wireless Domain view may be provided to show the wireless devices on the wireless network. The wireless devices typically are a subset of the usual devices discovered on a TCP/IP network. A Disassociated Mobile Devices view may be provided to display a list of wireless devices previously discovered on the wireless network but not currently associated with an access point. A Rogue Devices view is provided to display a list of rogue wireless devices.

The views are preferably dynamic, i.e. the user does not need to rerun a query to keep the contents of the views updated and current. Since the wireless devices are mobile and the wireless network configuration may be constantly changing, as the changes occur, they are immediately reflected in the views.

Besides providing a real-time view of the wireless network, the management solution may also project a future view, so that proactive measures can be taken to prevent problems before they occur.

The above specific embodiments are illustrative, and many variations can be introduced on these embodiments without departing from the spirit of the disclosure or from the scope of the appended claims. Elements and/or features of different illustrative embodiments may be combined with and/or substituted for each other within the scope of the disclosure and the appended claims.

Additional variations may be apparent to one of ordinary skill in the art from reading the following U.S. provisional applications, which are incorporated in their entireties herein by reference:

(a) U.S. Provisional Application No. 60/452,663, filed Mar. 7, 2003 and entitled "MOBILITY MANAGEMENT IN WIRELESS NETWORK"; and (b) U.S. Provisional Application No. 60/454,966, filed Mar. 14, 2003 and entitled "RELATIONAL MODEL FOR MANAGEMENT INFORMATION IN NETWORK DEVICES."

What is claimed is:

1. A system comprising:
a plurality of device agents, each device agent being assigned to collect association information from a corresponding set of access points in the wireless network and being operable to collect the association information from the corresponding set of access points by querying the access points in the corresponding set of access points, the association information from an access point comprising information identifying one or more mobile devices currently indicated to be associated with the access point, each of the mobile devices being actually associable with one and only one access point at a time; and
a device manager operable to receive the collected association information from the device agents, the device manager comprising a conflict resolution engine for resolving conflicting access point associations, the conflicting access point associations comprising two or more currently indicated associations of one and only one of the one or more mobile devices with respective two or more access points, the conflict resolution engine resolving the conflicting access point associations by identifying a single one of the two or more access points as being actually associated with the one and only one of the one or more mobile devices and identifying any others of the two or more access points as being disassociated with the one and only one of the one or more mobile devices.

2. The system of claim 1, wherein:
the association information from the access point further comprises address information of mobile devices associated with the access point; and
the conflict resolution engine uses the address information to resolve conflicting access point associations.

3. The system of claim 1, wherein:
the association information from the access point comprises time stamps associated with the association information; and
the conflict resolution engine is operable to use the time stamps to resolve the conflicting access point associations.

4. The system of claim 1, wherein the conflict resolution engine is operable to request appropriate ones of the device agents to query access points corresponding to the conflicting associations.

5. The system of claim 1, wherein the conflict resolution engine is operable to use network traffic statistics for a mobile device to resolve whether the device is associated with an access point.

6. The system of claim 1, wherein the conflict resolution engine is rule based.

7. The system of claim 1, wherein the device manager is operable to send a request to a device agent to trigger the query process of the device agent.

8. The system of claim 1, further comprising a topology service operable to provide, through a graphical user interface, a topographical visualization of current associations between the access points and the mobile devices.

9. The system of claim 8, wherein the visualization is associated with a subnet.

10. The system of claim 1, wherein the association information comprises identification of one or more disassociated mobile devices.

11. The system of claim 1, wherein the association information comprises information describing disassociation of a mobile device from an access point.

12. The system of claim 1, wherein the one and only one mobile device is one and only one physical mobile device.

13. A method comprising:
collecting association information from a plurality of access points in a wireless network by querying a plurality of access points for the association information, the association information from an access point comprising information identifying one or more mobile devices currently indicated to be associated with the access point, each of the mobile devices being actually associable with one and only one access point at a time;
resolving conflicting access point associations through a conflict resolution engine, the conflicting access point associations comprising two or more indicated current associations of one and only one of the one or more mobile devices with respective two or more access points; and
resolving the conflicting access point associations by identifying a single one of the two or more access points as being actually associated with the one and only one of the one or more mobile devices and identifying any others of the two or more access points as being disassociated with the one and only one of the one or more mobile devices.

14. The method of claim 13, further comprising using network traffic statistics for a mobile device to resolve whether the mobile device is associated with an access point.

15. The method of claim 13, wherein the one and only one of the one or more mobile devices is one and only one physical mobile device.

16. Software embodied in one or more computer-readable tangible media and when executed by one or more computer systems operable to:
   collect association information from a plurality of access points in a wireless network by querying the plurality of access points for the association information, the association information from an access point comprising information identifying one or more mobile devices currently indicated to be associated with the access point, each of the mobile devices being actually associable with one and only one access point at a time;
   resolve conflicting access point associations through a conflict resolution engine, the conflicting access point associations comprises two or more indicated current associations of one and only one of the one or more mobile devices with respective two or more access points; and
   resolving the conflicting access point associations by identifying a single one of the two or more access points as being actually associated with the one and only one of the one or more mobile devices and identifying any others of the two or more access points as being disassociated with the one and only one of the one or more mobile devices.

17. The software of claim 16, wherein the one and only one of the one or more mobile devices is one and only one physical mobile device.

18. A computer system comprising:
   a program storage device readable by the computer system and tangibly embodying a program of instructions; and
   a processor operable to execute the program of instructions to:
      collect association information from a plurality of access points in a wireless network by querying the plurality of access points for the association information, the association information from an access point comprising information identifying one or more mobile devices currently indicated to be associated with the access point, each of the mobile devices being actually associable with one and only one access point at a time;
      resolve conflicting access point associations through a conflict resolution engine, the conflicting access point associations being two or more indicated current associations of one and only one of the one or more mobile devices with respective two or more access points; and
      resolve the conflicting access point associations by identifying a single one of the two or more access points as being actually associated with the one and only one of the one or more mobile devices and identifying any others of the two or more access points as being disassociated with the one and only one of the one or more mobile devices.

19. The computer system of claim 18, wherein the one and only one of the one or more mobile devices is one and only one physical mobile device.

\* \* \* \* \*